first control generator means connected to one source for modulating said other source at a frequency and for controlling intensity of emission by said one source as a function of the input signals thereto;

second control generator means connected to the other source for modulating said other source at a different frequency and for controlling intensity of emission by said other source as a function of the input signals thereto;

set point value transmitter means for producing set point signals;

means including a first band-pass filter connected to said detector for receiving said electric signals and producing first output signals of said electric signals of said first frequency;

means including a second band-pass filter connected to said detector for receiving said electric signals and producing second output signals of said electric signals of said different frequency;

a first comparator device connected to receive said first output signals and said set point signals and to produce a first control signal as a function of the relationship therebetween, said comparator device being connected to said first control generator means for supplying said first control signal as the input signal of the latter; and a second comparator device connected to receive said second output signals and said set point signals and to produce a second control signal as a function of the relationship therebetween, said second device being connected to said second control generator means for supplying said second control signal as the input signal of the latter.

8. An apparatus as set forth in claim 1, wherein said part comprises a photoelectric detector for producing electric signals and said apparatus comprises:

first control generator means connected to one source for modulating said one source at a first frequency and for controlling intensity of emission by said one source as a function of the input signals thereto;

second control generator means connected to the other source for modulating said other source at a different frequency and for controlling intensity of emission by said other source as a function of the input signals thereto;

set point value transmitter means for producing set point signals;

means including a first band-pass filter connected to said detector for receiving said electric signals and producing first output signals of said electric signals of said first frequency;

means including a second band-pass filter connected to said detector for receiving said electric signals and producing second output signals of said electric signals of said different frequency;

a first comparator device connected to receive said first output signals and said set point signals and to produce a first control signal as a function of the relationship therebetween, said comparator device being connected to said first control generator means for supplying said first control signal as the input signal of the latter; and a second comparator device connected to receive said second output signals and said set point signals and to produce a second control signal as a function of the relationship therebetween, said second device being connected to said second control generator means for supplying said second control signal as the input signal of the latter.

9. An apparatus as set forth in claim 1, wherein said control means and said comparison means comprises:

a clock;

a control generator for supplying energy for said sources in response to information signals to the control generator;

means including a first switch connecting the generator and the sources, said switch being connected to said clock for alternately rendering one and then the other source responsive to said generator;

a set point value transmitter means for producing set point signals;

first and second amplitude controller means connected to said transmitter to receive the set point signals, each controller means producing an output control signal which is a function of the relationship of the set point signal to the input signal of the controller means;

circuit means including a second switch connecting the controller means to said part whereby said part provides the input signals to said controller means, said second switch means being connected to said clock for alternately applying the input signals to one and then the other controller means; and circuit means including a third switch connecting the controller means to said control generator for supplying said output signals to the control generator to serve as said information signals, said third switch means being connected to said clock for alternately supplying the output signals of first one and then the other controller means to said control generator.

10. In an apparatus as set forth in claim 9, wherein said comparator comprises comparator photoelectric detector means for producing electric signals;

a variable amplifier connected to said comparator detector means for receiving the electric signals therefrom and producing amplified signals;

signal evaluation and indicating means;

a set point device for producing standard signals;

an amplitude controller device connected to the set point device and the variable amplifier for producing amplifier corrective signals as a function of the relationship between the input signals to it and the standard signals; and circuit means including a fourth switch connected to said variable amplifier to apply said amplified signals and to said evaluation and indicating means and said amplitude controller device as input signals to the latter, said fourth switch being connected to said clock for alternately applying said amplified signals as input signals to said signal evaluation and indicating means and to said amplitude controller device.

11. A method of operating an optical double-beam measuring instrument in which a modulated measuring beam from a first light source which may vary in intensity is directed along a first path which includes an area whose characteristics are to be measured and is subsequently compared at a comparator with a modulated comparison beam from a second comparable source which is directed along a second path, the improvement comprising the following steps:

between the first source and said area, branching a first partial beam from said measuring beam and directing said first partial beam to a point apart from said comparator;

branching a second partial beam from said comparison beam and directing said second partial beam to said point apart from said comparator;

receiving said partial beams at said point, determining the relative intensities thereof and automatically controlling the intensity of at least said one source to maintain a predetermined relationship between the intensities of said sources.

* * * * *

350-166.

12-28-71    XR    3,631,409

[11] 3,631,409

| [72] | Inventor | William R. Buchan |
| | | Lincoln, Mass. |
| [21] | Appl. No. | 53,767 |
| [22] | Filed | June 24, 1970 |
| [45] | Patented | Dec. 28, 1971 |
| [73] | Assignee | Itek Corporation |
| | | Lexington, Mass. |

[54] ELECTRO-OPTIC READOUT OF INFORMATION USING A SCHLIEREN OPTICAL SYSTEM
22 Claims, 8 Drawing Figs.

[52] U.S. Cl. ...................................340/173 LM,
    350/160 R, 350/166
[51] Int. Cl. ..........................................G11c 13/04
[50] Field of Search............................340/173
    LM, 173 LS, 173 PP; 350/160 R, 160 P, 161, 166,
    320, 321

[56] References Cited
UNITED STATES PATENTS

| Re. 22,115 | 6/1942 | Herbst................ | 350/160 R |
| 3,278,749 | 10/1966 | Seidel.................. | 350/160 R |
| 3,304,428 | 2/1967 | Peters................... | 350/160 R |
| 3,341,826 | 9/1967 | Lee ..................... | 340/173 LM |
| 3,529,300 | 9/1970 | McDaniel............... | 340/173 PP |

OTHER REFERENCES

"The International Dictionary of Physics and Electronics" Jan Nostrand p. 1,018 QC5I5 1961

*Primary Examiner*—Terrell W. Fears
*Attorneys*—Homer O. Blair, Robert L. Nathans, David E. Brook and Joseph S. Iandiorio ABSTRACT: Apparatus is disclosed for reading out information present in the form of variations in electric field intensity using a Schlieren system to focus regular wave fronts passing through an electro-optic medium, whose index of refraction varies as a function of an applied electric field, at an opaque spot and to focus disturbed wave fronts, whose distortions are created by variations in the index of refraction of the medium caused by variations in the applied electric field, in the space surrounding that spot to form a representation of the information present in the electric field applied to the medium.

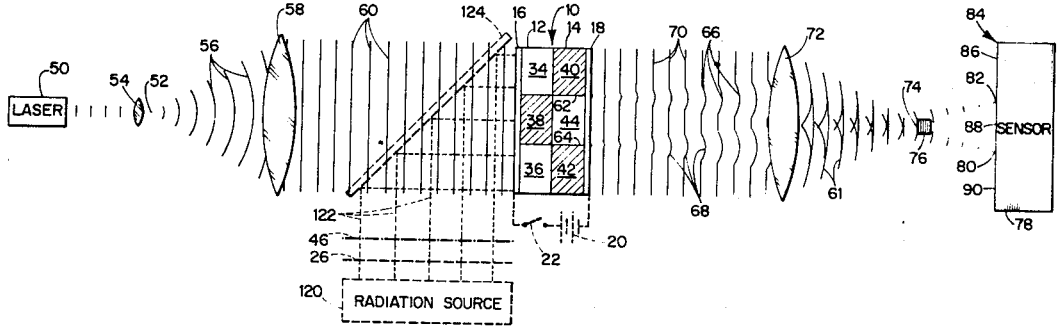

Patented Dec. 28, 1971

INVENTOR
WILLIAM R. BUCHAN

BY

Jandiorio & Grodberg
ATTORNEYS

Patented Dec. 28, 1971

INVENTOR
WILLIAM R. BUCHAN

BY

Jandiorio & Grodberg
ATTORNEYS

ELECTRO-OPTIC READOUT OF INFORMATION USING A SCHLIEREN OPTICAL SYSTEM

CHARACTERIZATION OF INVENTION

The invention is characterized in a method of reading out information present in the form of variations of electric field intensity using a Schlieren system comprising applying to an electro-optic medium, whose index of refraction varies as a function of the intensity of an associated electric field, an electric field whose intensity varies in a pattern representative of information contained therein, providing to the medium regular wave fronts of radiation, and focusing the regular wave fronts from the medium at an opaque spot and disturbed wave fronts from the medium in the space about the spot to form a representation of the information present in the electric field applied to the medium.

BACKGROUND OF INVENTION

This invention relates to electro-optic readout of information present in an electric field, and more particularly to such a readout technique utilizing an electro-optic medium, whose index of refraction varies with the intensity of an applied electric field, in a Schlieren system.

The demand for higher density and higher speed information storage and retrieval means and methods as well as the increased interest in optical information processing and optical recording means has focused attention on electro-optical techniques for storing, retrieving, recording, and transforming optical information.

Information may be present in the form of variations in the intensity of an electric field momentarily, as in the case of image intensifying or converting operations or for longer periods, as in the case of information stored in electric fields by means of semiconductors, ferroelectric materials or photoelectrets. There are a number of advantages in representing information in the form of variations in the intensity of an electric field. For example, many discrete information bit locations may be contained in a very small area and no moving parts are required. But quick, efficient readout of information in the form of variations of the intensity of an electric field presents new problems because of the very small energy levels involved. For example, when the information present in the field is read out directly, electrically, low signal-to-noise ratios often occur rendering the output signal nearly useless.

SUMMARY OF INVENTION

Thus it is desirable to have available a new method an apparatus for optical readout of information present in the form of variations in the intensity of an electric field.

It is also desirable to have available such a method and apparatus which uses an electro-optic medium whose index of refraction varies as a function of intensity of an associated electric field.

It is also desirable to have available such a method and apparatus using a Schlieren system.

The invention may be accomplished by apparatus including a Schlieren system for reading out information present in the form of variations in electric field intensity. An electric field whose intensity varies in a predetermined pattern according to information contained therein is applied to an electro-optic medium whose index of refraction varies as a function of an associated electric field. The medium is subject to regular wave fronts which may be planar wave fronts that are disturbed in areas where the index of refraction of the medium has been changed by the electric field. The regular wave fronts or regular portions thereof are imaged at an opaque spot at the focus of a lens and disturbed wave fronts or disturbed portions of regular wave fronts are focused in the space about the spot to form a representation of the information present in the electric field applied to the medium.

DISCLOSURE OF PREFERRED EMBODIMENT

Other objects, features and advantages will occur from the following description of a preferred embodiment and the accompanying drawings, in which.

Figure 2:
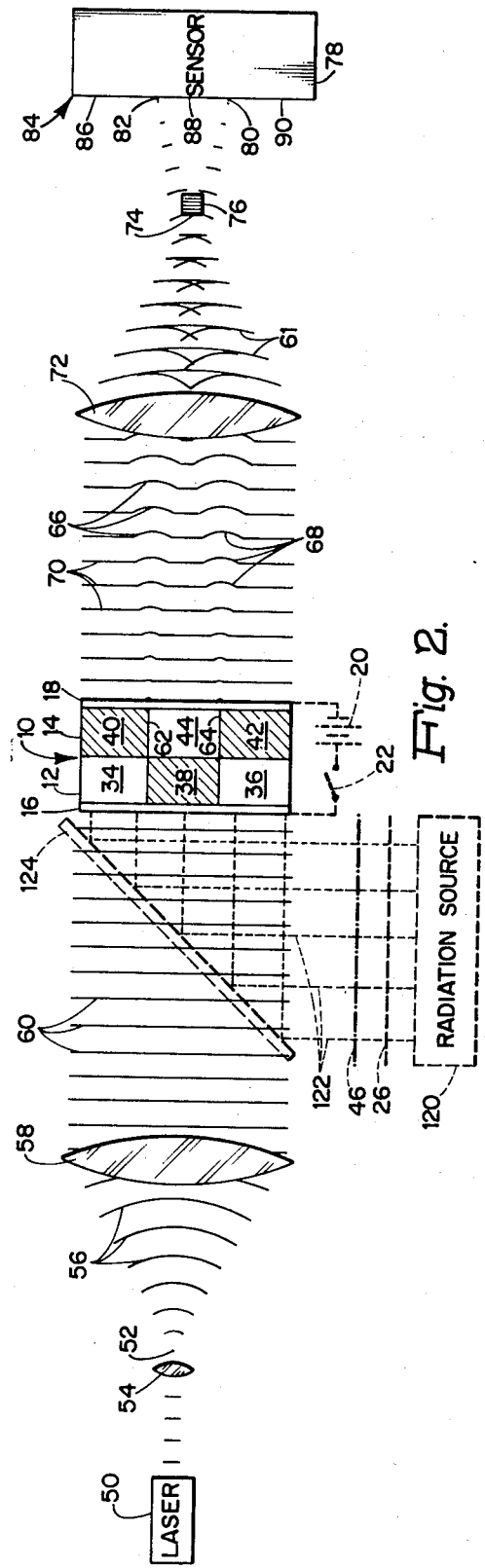
FIG. 2 is a diagrammatic view of apparatus for reading information in an electric field associated with an electro-optic medium using a Schlieren system.
Figure 1:
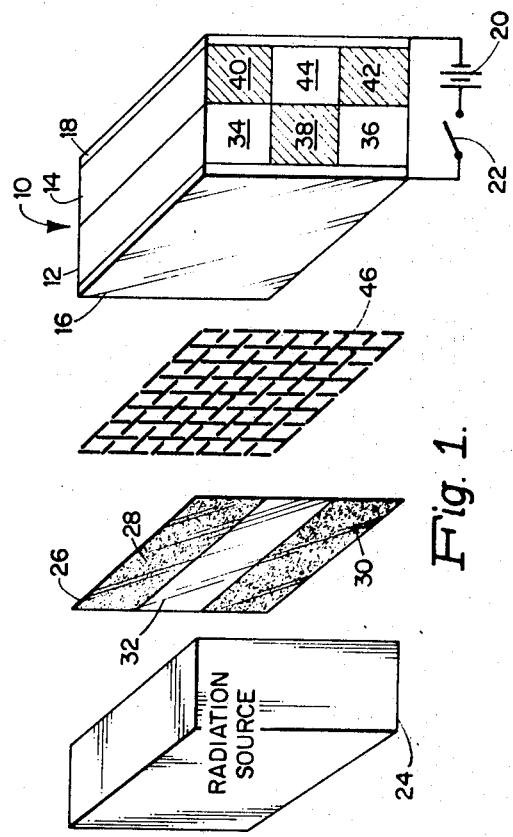
FIG. 1 is an axonometric view of apparatus for producing an electric field, whose intensity varies in accordance with an information bearing image, associated with an electro-optic medium.

3 is a density profile of the transparency of FIGS. 1 and 2.

Figures 3, 4:
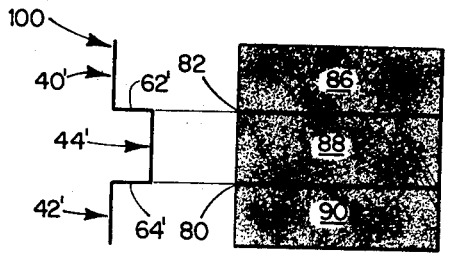

FIG. 4 is the image formed from the transparency of FIG. !1 by the apparatus of FIG. 2.

Figure 5:
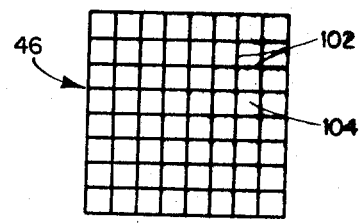

FIG. 5 is a grid for increasing the spatial frequency of the intensity variations of the electric field present in the electro-optic medium of FIG. 2.

Figures 6, 7:
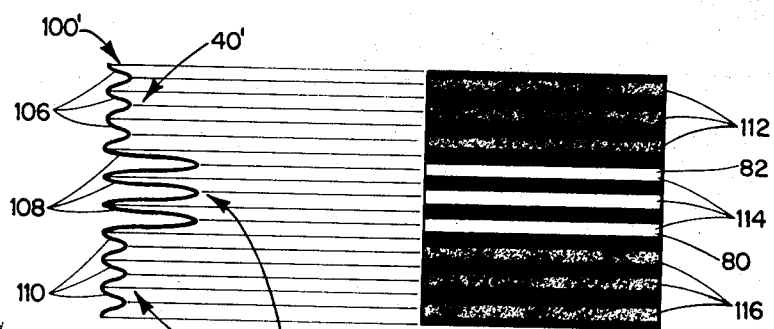

FIG. 6 is a density profile of the transparency of FIGS. 1 and 2 produced using the grid of FIG. 5.

FIG. 7 is the image formed from the transparency of FIG. 1 using the grid of FIG. 5 in the apparatus of FIG. 2

Figure 8:
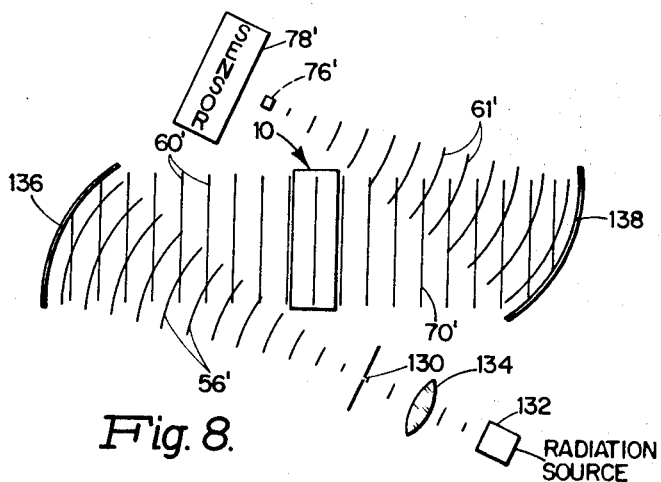

FIG. 8 is an alternative apparatus according to this invention substituting concave reflection means for the lenses of FIG. 1.

The invention may be used to read out information present in the form of variations of the intensity of an electric field associated with an electro-optic layer whose index of refraction varies as a function of the intensity of an applied electric field. The pattern of variations of electric field intensity representative of some particular information may be created in the electric field by exposing a photoconductor layer adjacent the electro-optic layer to a radiant image whose radiation intensity varies as a function of the particular information. A pair of electrodes connected to a battery provide an electric field across the adjacent layers whose intensity in the electro-optic layer varies as a function of the pattern of variation of the conductivity of the photoconductive layer created by the radiant image. When the photoconductive layer is dark and its resistance is high most of the voltage occurs across it, whereas when the photoconductor is illuminated and its resistance is low most of the voltage occurs across the electro-optic layer. Since a higher intensity electric field produces a higher index of refraction, and since the index of refraction $n$ is defined as:

$$n = Y_o/Y_m$$

where $Y_o$ is the speed of radiation in a vacuum and $Y_m$ is the speed of radiation in another medium, the areas of increased index of refraction pass radiation at a slower speed than the areas of decreased radiation.

Therefore, during readout when the layer is subject to regular wave fronts, portions of the regular wave fronts that pass through areas of the electro-optic layer subject to higher field intensity lag those portions that pass through areas of the layer subject to lower field intensity. The disturbed wave fronts emerging from that layer are received by a lens which is selected to focus the particular shape of the regular wave fronts at an opaque spot and to focus the irregular portions of wave fronts in the space about that opaque spot to form an image representative of the information present in the electric field. Where the electro-optic layer one in which the index of refraction decreases with increases of electric field intensity, the disturbances of the wave fronts would appear as leading portions. The readout may be performed serially, as for example by scanning the electro-optic layer with a beam of regular wave fronts, or in parallel by irradiating the whole layer at once with regular wave fronts. The readout wave fronts may be subjected to the device either during or after the exposure of the photoconductive layer.

If the electro-optic layer is as well an electric blocking layer, the battery may be disconnected after the exposure of the photoconductive layer and the charges that migrated while the